INVENTOR.
EDWIN O. CARPENTER

United States Patent Office 3,146,676
Patented Sept. 1, 1964

3,146,676
MACHINE TOOL CONTROL MECHANISM
Edwin O. Carpenter, Cincinnati, Ohio, assignor to The Cincinnati Milling Machine Co., Cincinnati, Ohio, a corporation of Ohio
Filed June 6, 1962, Ser. No. 200,405
11 Claims. (Cl. 90—21)

The present invention relates to mechanism for machining workpieces of random dimension and, more particularly, to mechanism operable to produce a cut controlled with reference to the particular workpiece being machined from a group, or lot, of random sized workpieces.

In ordinary repetitive machine tool operations, the machine is set up to undergo identical repetitive cycles, and when identical workpieces are successively inserted in the machine, one at a time, identical finished workpieces with identical cuts thereon are produced. When, however, the lot of workpieces to be machined are of random dimension, or length, the machine must be set up or adjusted with reference to each particular workpiece to be machined if the desired machining operation on each of the different workpieces is to be produced.

In the present invention there is provided mechanism by which desired operations on successive workpieces of random dimension can be effected with minimum effort between operations on successive workpieces. In brief, there is provided a locating member which, when engaged with a reference surface on the particular workpiece in the machine, automatically sets up the machine for the desired operation on that particular workpiece. For example, if one end of each workpiece is gripped in a machine tool and a machining operation is required in predetermined spaced relation to the opposite end of the workpiece, the locating member is moved into engagement with said opposite end of each workpiece before the operation thereon, and a control member carried by the locating member is thereby automatically positioned to control the machining operation in reference to said opposite end surface.

In the preferred form of the invention, the workpiece is gripped at one end by a headstock member secured to a table member and is supported at the opposite end by a tailstock member which is slidably mounted on the table member for positioning, as the workpiece is loaded, against the end of the workpiece. The tailstock member has at least one control dog mounted thereon and the tailstock serves, not only to support one end of the workpiece, but to automatically position the control dog with reference to the end of the workpiece engaged by the tailstock. Means is provided to effect relative longitudinal movement and relative cross movement between the workpiece and a cutting tool, the relative cross movement being effected in accordance with the position of the control dog so that the tool begins a cut a predetermined distance from the reference end surface engaged by the tailstock regardless of the distance of said reference end surface from the other end of the workpiece.

If the cut is to be the same length on each workpiece regardless of the length of the workpiece, the cross movement is controlled by a control dog on the tailstock to effect relative retraction between the tool and the workpiece. If, on the other hand, the cut is to be of a length determined by the length of the workpiece, and terminate a predetermined distance from the end gripped by the headstock, the cross movement is controlled by a control dog on the table member to effect relative retraction between the tool and the workpiece.

It is therefore one object of the present invention to provide mechanism for effecting a machining operation on successive workpieces of random dimension.

It is another object of the present invention to provide mechanism for effecting a machining operation relative to a reference surface on a workpiece.

It is yet another object of the present invention to provide mechanism for initiating a machining operation a predetermined distance from one end of a workpiece of random length.

It is still another object of the present invention to provide mechanism for initiating a machining operation a predetermined distance from one end of each workpiece of a lot of workpieces of random length, and terminating the machining operation a predetermined distance from the other end of each of the workpieces.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
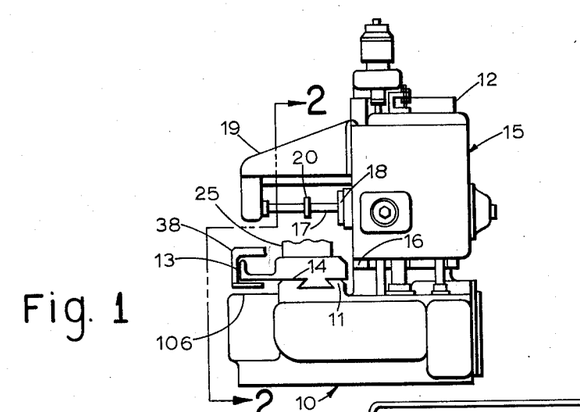
FIG. 1 is a view in elevation of a milling machine in which the mechanism of the present invention is incorporated.

The present invention is illustrated in a milling machine of the type shown and described in U.S. Patent 2,365,043 of Louis H. Blood and Hans Ernst, issued December 12, 1944. The machine has a base 10 comprising a horizontal bed portion 11 and an upstanding column portion 12. A table 13 is mounted on horizontal ways 14 of the bed portion 11 for reversible movement in a longitudinal direction, indicated by arrow A. A tool carrier 15 is mounted on vertical ways 16 of the column portion 12 for reversible movement in a cross direction indicated by arrow B. The tool carrier 15 has an arbor 17 rotated by the carrier spindle 18 and supported by the carrier overarm 19. A tool 20 is mounted on the arbor over the table 13.

A headstock 25 is secured to table 13 by bolts 26. The headstock has a chuck 27 adapted to grip the inner end 28a of a workpiece 28, and the chuck has a rear surface 29 against which a workpiece fully seated therein abuts. In the operation on the workpiece illustrated, the workpiece is not rotated, but, if rotation of the workpiece is required, rotation would be effected by the headstock either through a rotating chuck or other suitable driving means. The table 13 includes a way plate 31 secured by bolts 32, and a tailstock 30 is slidably received on longitudinally extending ways 33 of table plate 31 for movement thereon towards and away from the headstock 25. The tailstock includes a support block 34 secured by bolts 35, an upstanding end plate 36 secured by bolts 37, and a control bracket 38 secured by bolts 39. The end plate 36 has a locating surface 40 for abutment against the outer end 28b of a workpiece held in chuck 27. The control bracket has an inturned flange 41 extending under the table 13. The table way plate 31 has an upstanding end bracket 42 to which a piston 43 is connected by rod 44. The piston 43 is received in a cylinder 45 secured to the tailstock by bolts 46. Means to introduce air under pressure to cylinder 45 is shown schematically in FIG. 2. Valve 47 has a pressure port 48, connected to a source (not shown) of air under pressure, and a discharge port 49. When handle 50, connected to the rotatable valve core 51, is rotated to the position shown in solid lines, air under pressure is introduced to chamber 52 on one side of the piston and the chamber 53 on the opposite side of the piston is vented to atmosphere through discharge port 49. When the handle 50 is in the position shown in dotted lines, the pressure conditions in chambers 52 and 53 are reversed.

The piston 43 and cylinder 45 define a positioning motor between the table and tailstock to position the locating surface 40 of the tailstock against the outer end of a workpiece, after the inner end thereof has been placed in the chuck. For machining workpieces of random length, the stroke of the positioning motor should be long enough to position the tailstock against the outer ends of the longest and shortest workpieces. The tailstock 30 defines a locating member which, when held against a reference surface on the workpiece (such as the outer end surface of the workpiece) during the machining operation, holds the control bracket 38 thereof in fixed relation to the reference surface regardless of the length of the workpiece.

Figure 4:
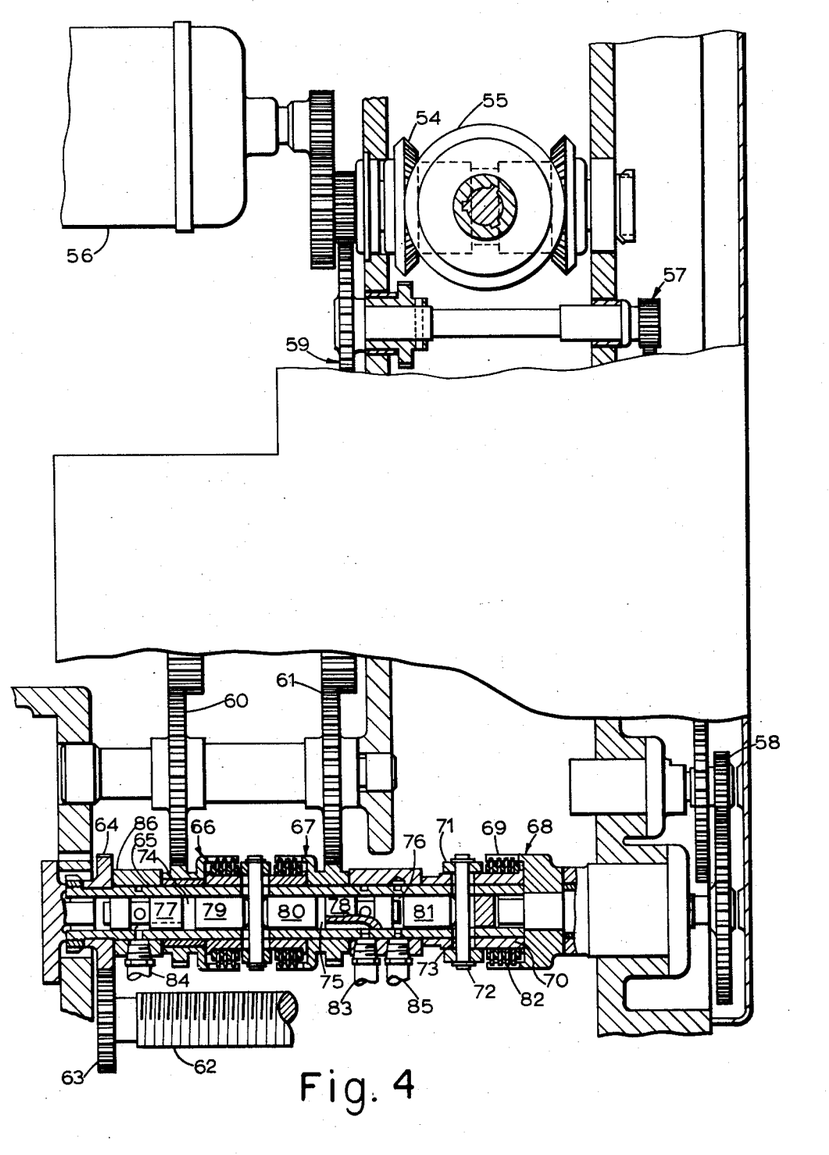
FIG. 4 is a view showing portions of the transmission and clutch members through which the table is driven.

Relative longitudinal movement between the tool and the table member, and hence the tool and the workpiece, is effected by means of a motor 56 (FIG. 4) which moves the table in the longitudinal direction. The motor 56, which also drives the spindle 18 through a gear train including bevel gears 54, 55, is operatively connected to a table feed gear train 57, terminating in gear 58, and a rapid traverse gear train 59, terminating in oppositely rotating gears 60 and 61. Screw 62 is threadedly engaged with table 13 and is connected, through gears 63, 64, with hollow drive shaft 65. Three clutches 66, 67, 68 are mounted on the drive shaft, each having an outer hub portion 69 rotatable relative to the drive shaft when the clutch is disengaged, and an inner portion 70 secured to the drive shaft. A clutch actuating ring 71 is mounted between clutches 66, 67 and adjacent clutch 68. Each ring 71 carries a pin 72 extending through slots 73 in the drive shaft and inner clutch portion 70. Chambers 74, 75, 76 are defined between fixed plugs 77, 78 and shiftable plugs 79, 80, 81. The shiftable plugs are adapted to engage pins 72 and, when pressure is introduced to a chamber, the clutch actuating ring 71 is shifted to lock the inner and outer clutch portions of a clutch together through plates 82 and effect engagement of the clutch. When pressure is relieved in the chamber, the outer clutch member 69 can rotate relative to the inner clutch member 70, and the clutch is disengaged.

Lines 83, 84, 85, are connected, respectively, to fixed collector rings 86 for communication with chambers 74, 75, 76, and pressure is applied to the clutches, one at a time, through these lines. The outer members of clutches 66, 67, 68 are continuously rotated, respectively, by the gears 60, 61, 58, and, when one of the clutches is engaged, the table screw 62 is rotated through drive shaft 65. Engagement of clutch 66 effects rapid traverse movement of the table to the left (as viewed in FIG. 2); engagement of clutch 68 effects feed movement of the table to the left; engagement of clutch 67 effects rapid traverse movement of the table to the right.

Relative cross movement between the tool 20 and the table member 13, and hence between the tool and the workpiece 28, is effected by motor 90 which raises and lowers the tool carrier 15. The motor 90 consists of a cylindrical bore 91 formed in upstanding column portion 12 of the base and slidably receiving piston 92 which is connected by rod 93 to the spindle carrier 15. When fluid under pressure is applied to the chamber 94 below the piston through line 95 and ball check valve 96, and chamber 97 above the piston is connected to exhaust by line 98, the spindle carrier is rapidly raised, retracting the tool from the workpiece. When line 98 is connected to the source of pressure, and line 95 connected to exhaust, the spindle carrier is lowered. Discharge from chamber 94 occurs through line 99 and rate valve 100 at a rate determined by the longitudinal position of plunger 101 of that valve. As spindle carrier 15 moves downwardly, crank 102 is moved counterclockwise by the cam surface 103 on cam block 104 connected to piston rod 93. This moves plunger 101 down, decreasing the flow through the valves and through line 105 to line 95. Thus the tool initially advances rapidly toward the workpiece but slows down to a slow feed rate as it enters the workpiece. Limit switch 6LS is mounted in the upstanding column 12 for operation when the spindle carrier and tool is fully retracted; limit switch 7LS is mounted in column 12 for operation when the tool is in the workpiece to the desired depth.

The bed portion 11 of the base 10 has a horizontal control panel 106 from which control members 1LS, 2LS, 3LS, 4LS, and 5LS extend. The control members illustrated are limit switches which, when operated, initiate signals for control of the machine tool. Since the control members are mounted in the base and the tool 20 moves relative to the base only in the crossdirection, the control members 1LS, 2LS, 3LS, 4LS, 5LS are all fixed relative to the tool in the longitudinal direction. The limit switches are spaced apart so that each is positioned in the path of one of the control dogs 1CD, 2CD, 3CD, 4CD, and 5CD. Two of the control dogs 1CD and 5CD are mounted on table 13, to travel in the paths containing, respectively, 1LS and 5LS. When the control dogs 1CD and 5CD are clamped to the table, they remain in fixed relation to the chuck 27 which is also mounted on the table, and hence they are in the same fixed relation to the inner end 28a of all workpieces from a lot of random sized workpieces when each is successively fully seated in and gripped by the chuck, regardless of the length of the workpiece. Control dogs 2CD, 3CD, and 4CD are mounted on the tailstock control bracket 38 to travel in paths containing, respectively, limit switches 2LS, 3LS and 4LS. The control dogs 2CD, 3CD, and 4CD, when clamped to the control bracket, will remain in fixed relation to the tailstock locating surface 40 and hence are in the same fixed predetermined relation to the outer end 28b of all workpieces from a lot of random sized workpieces when each is successively engaged by locating surface 40, regardless of the length of the workpiece.

Figure 5:
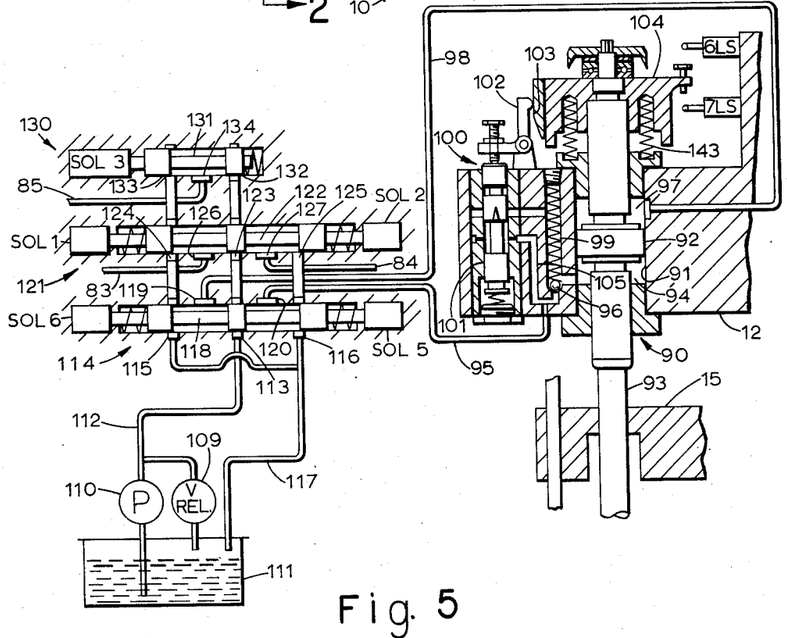
FIG. 5 is a schematic diagram of a portion of the hydraulic circuit of the machine.

Hydraulic fluid under pressure is applied to clutches 66, 67, 68, and chambers 94, 97 of motor 90 through the hydraulic circuit shown in FIG. 5. Pump 110 takes fluid from sump 111 and delivers it under pressure to pressure line 112, relief valve 109 being connected to line 112 and discharging to the sump to limit the maximum pressure in line 112. Line 112 is connected to pressure port 113 of the spindle carrier reversing valve 114. Valve 114 has two discharge ports 115 and 116 connected to return line 117, and a spring centered solenoid operated valve plunger 118. When both solenoids SOL 5 and SOL 6 are deenergized, the valve plunger 118 blocks pressure port 113 so that pressure is blocked from the two motor ports 119 and 120 connected, respectively, to lines 98 and 95. When solenoid SOL 6 is energized and solenoid SOL 5 deenergized, valve plunger 118 is shifted to the right (as viewed in FIG. 5) and pressure is supplied to motor port 119 and line 98 to lower the spindle carrier and advance the tool 20 relative to the workpiece 28. With valve plunger 118 to the right, motor port 120 and line 95 are connected through discharge port 116 to return line 117. When solenoid SOL 5 is energized and solenoid SOL 6 deenergized, valve plunger 118 is shifted to the left, connecting line 95 to pressure line 112 and line 98 to return line 117, and the spindle carrier 15 rises to retract the tool 20 from the workpiece 28.

Operation of the rapid traverse clutches 66 and 67 which determine rapid traverse movement of the table 13 is effected through reversing valve 121 having a spring centered solenoid operated valve plunger 122. Pressure port 123 of valve 121 is continuously connected to the source of pressure through line 112 and the annular pressure port channel of valve 114. Similarly, discharge ports 124 and 125 are continuously connected to the sump through annular channels at the discharge ports of valve 114. When solenoid SOL 1 is energized and solenoid SOL 2 deenergized, valve plunger 122 is shifted to the right and pressure port 123 is connected to motor port 126 which is connected through line 83 to clutch 66. Motor port 127 is connected to return line 117 at this time. When solenoid SOL 2 is energized and solenoid SOL 1 deenergized, valve plunger 122 shifts to the left to connect motor port 127 to pressure, and pressure is supplied through line 84 to clutch 67. Motor port 126, and hence clutch 66, is connected to the sump at this time.

Figure 2:
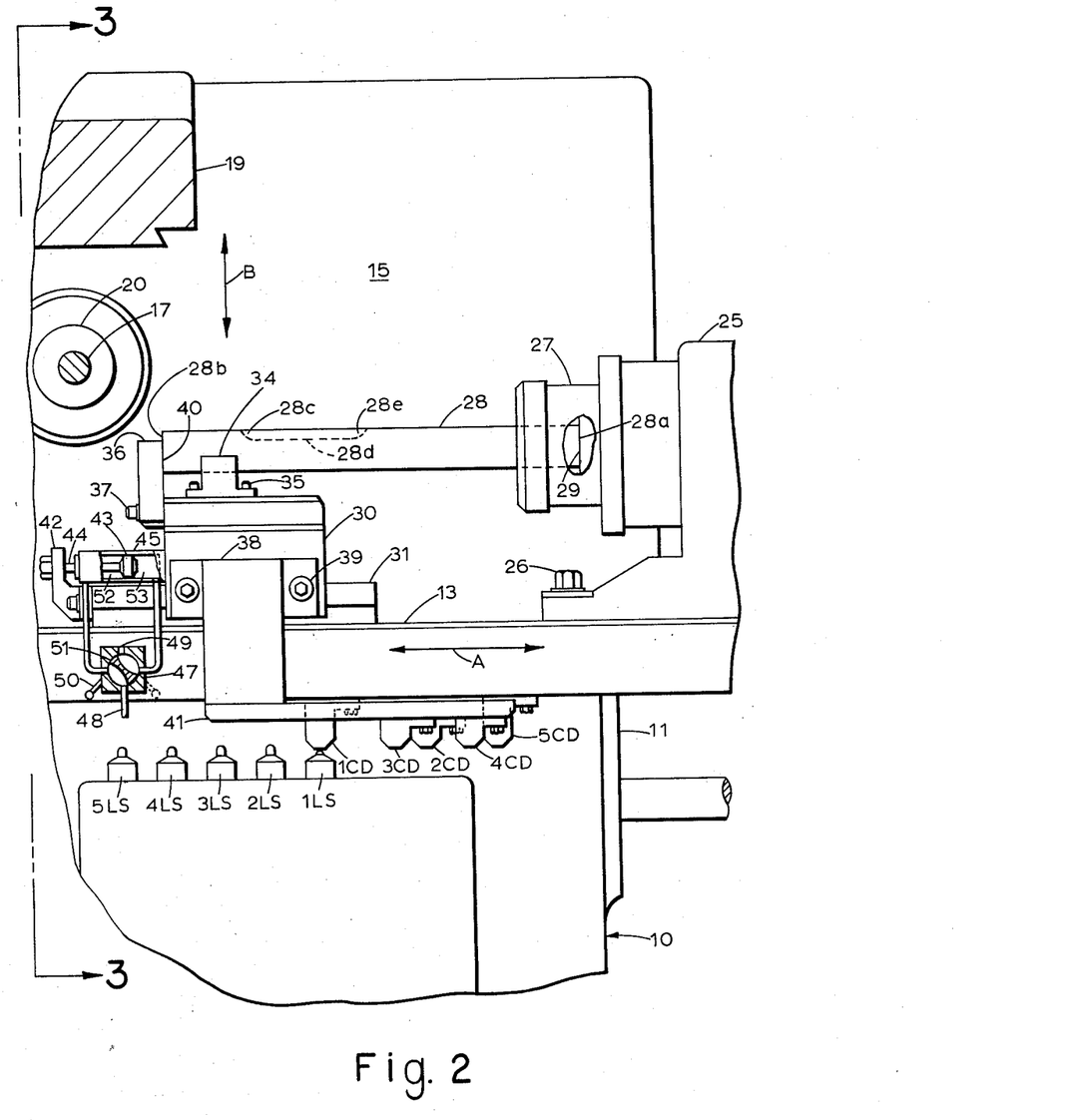
FIG. 2 is a view taken on the line 2—2 of FIG. 1.
Figure 3:
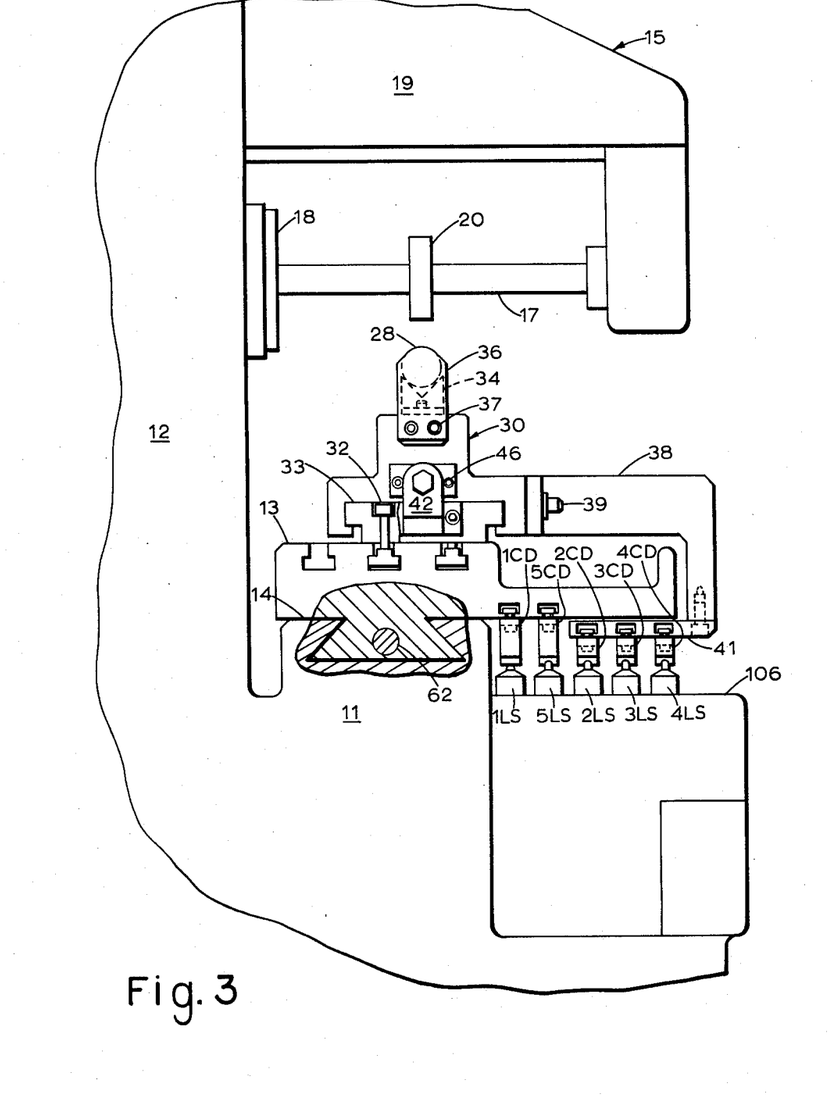
FIG. 3 is a view taken on the line 3—3 of FIG. 2.

Feed movement of the table 13, which occurs only to the left as viewed in FIG. 2, is controlled through valve 130 having a spring biased solenoid operated valve plunger 131. Pressure port 132 is continuously connected to pressure line 112 and discharge port 133 is continuously connected to return line 117. When solenoid SOL 3 is energized, valve plunger 131 is shifted to the right and motor port 134 is connected to pressure port 132 to supply pressure through line 85 to clutch 68.

In the normal condition of the valves 114, 121, 130, that is, with the solenoids deenergized and the position of the valve plungers determined solely by the springs, all the motor parts are blocked from the pressure ports and in communication with a discharge port.

The coordination between longitudinal movement of the table 13 (and hence the workpiece 28) and cross movement of the spindle carrier 15 (and hence the tool 20) is determined by operating engagement between control elements. The table 13 has a home position on the base, shown in FIG. 2, determined by the position of control dog 1CD on the table. The tool 20 has a home, or retracted, position, relative to the base, also shown in FIG. 2, determined by the limit of movement of piston 92 in bore 91. The fully advanced position of the tool is determined by the position of limit switch 7LS on the base. Control elements 2CD, 3CD, 4CD mounted on the tailstock control bracket 38 control relative movement between the tool 20 and the workpiece 28 in relation to the reference end surface at outer end 28b of the workpiece, regardless of the length of the particular workpiece being machined, since the tailstock defines a locating member which is shifted into engagement with the outer end of each piece as it is loaded in the machine and which is held in engagement with the outer end of the piece during the operation thereon. Control elements 1CD, 5CD mounted on the table control relative movement between the spindle carrier 15 (and hence the tool 20) and the table 13 (and hence the workpiece 28) relative to the inner end 28a of the workpiece, regardless of the length of the workpiece, since the chuck 27 which grips the inner end of the workpiece is secured in a fixed position on the table before and during the operation on the workpiece. Thus, if control elements clamped in a fixed position on the tailstock control bracket during a run of successive workpieces of random length are utilized to control both relative advance and retraction of the tool and workpiece, the beginning and end of the cut, on each piece, will be in predetermined relation to one end of the workpiece (the outer end as mounted in the machine), and the cut on all pieces regardless of length of the pieces will be the same length and the same distance from the one end. Alternately, by use of a control element on the tailstock control bracket to initiate advance of the tool and a control element on the table to initiate retraction of the tool, the beginning of the cut will be the same predetermined distance from one end of all the workpieces (the outer end as mounted in the machine) and the end of the cut will be the same predetermined distance from the other end of all the workpieces (the inner end as mounted in the machine), regardless of the random length of the individual workpieces in the lot.

Figure 6:
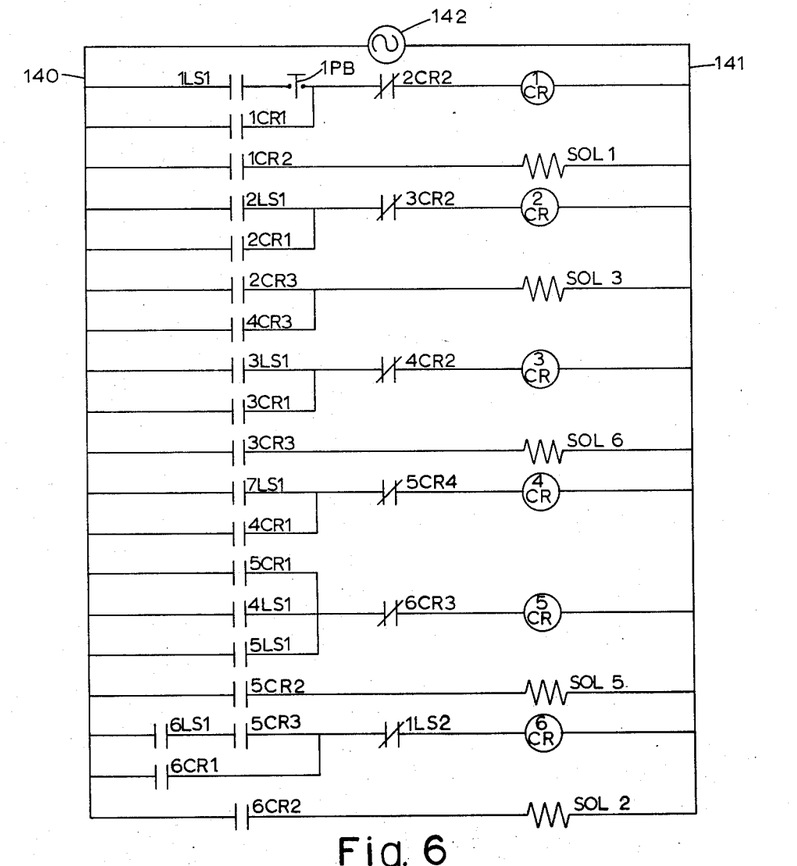
FIG. 6 is a schematic diagram of a portion of the electrical circuit of the machine.

Electrical lines 140 and 141 are connected to electrical energy source 142. When the table 13 is in the home position on the base, limit switch 1LS is operated by control dog 1CD mounted on the table in the path of limit switch 1LS, and normally open contact 1LS1 thereof is closed. When normally open push button switch contacts 1PB are momentarily closed, relay 1CR is energized through contacts 1LS1, 1PB, and normally closed contacts 2CR2 of relay CR2. Relay 1CR is sealed in through its own normally open contacts 1CR1 connected around contacts 1LS1 and 1PB. With relay 1CR energized, normally open contacts 1CR2 are closed and solenoid SOL 1 is energized to begin rapid traverse of the table 13 to the left as viewed in FIG. 2.

Control dog 2CD is mounted on the tailstock control bracket in predetermined spaced relation to the outer end of the particular workpiece mounted in the machine and when limit switch 2LS, which is in the path of control dog 2CD, is operated thereby, the normally open contacts 2LS1 thereof are closed and relay 2CR is energized through contacts 2LS1 and normally closed contacts 3CR2. Energization of relay 2CR closes normally open contacts 2CR1 thereof to seal in relay 2CR, and opens normally closed contacts 2CR2 to drop out relay 1CR, and hence drop out solenoid SOL 1. At the same time normally open contacts 2CR3 of relay 2CR are closed to energize solenoid SOL 3 and begin feed movement of the table 13 to the left.

After the table has slowed down to a relatively slow feed rate, limit switch 3LS, which is in the path of control dog 3CD mounted on the tailstock control bracket, is operated by that control dog and normally open contacts 3LS1 thereof are closed. This energizes relay 3CR through contacts 3LS1 and normally closed contacts 4CR2, closing normally open contacts 3CR1 of relay 3CR to seal in that relay. At the same time normally closed contacts 3CR2 are opened to drop out relay 2CR and solenoid SOL 3, stopping the table. Energization of relay 3CR also closes normally open contacts 3CR3 to energize solenoid SOL 6 which initiates cross movement of the spindle carrier 15 to advance the tool toward the workpiece.

As the rotating tool enters the work, at 28c, limit switch 7LS is operated and relay 4CR is energized through normally open contacts 7LS1 of that switch and normally closed contacts 5CR4. When relay 4CR is picked up, normally open contacts 4CR1 thereof close to seal in the relay and normally closed contacts 4CR2 open to drop out relay 3CR and hence solenoid SOL 6, stopping advance of the tool. At the same time, contacts 4CR3 close to again energize solenoid SOL 3 and start feed movement of the table to the left, machining a flat 28d on the workpiece.

The coordination between the longitudinal movement of the workpiece and retraction of the tool will be controlled either by the complementary control members 4CD, 4LS (if the cut is to be terminated a particular distance from the outer end of the workpiece) or by the complementary control members 5CD, 5LS (if the cut is to be terminated a particular distance from the inner end of the workpiece). In the former case, control dog 5CD, which is mounted on the table, can be rendered ineffective by removal or by positioning so it will not engage limit switch 5LS before control dog 4CD engages limit switch 4LS; in the latter case, control dog 4CD, which is mounted on the tailstock control bracket, is removed or moved back to prevent contact with limit switch 4LS before control dog 5CD contacts limit switch 5LS.

When one or the other of limit switches 4LS, 5LS is operated, the normally open contacts 4LS1 or 5LS1 thereof are closed and relay 5CR is energized through these contacts and normally closed contacts 6CR3 of relay 6CR. This closes normally open contacts 5CR1 of relay 5CR to seal in that relay, and closes normally open contacts 5CR2 to energize solenoid SOL 5. At the same time normally closed contacts 5CR4 open to drop relay 4CR, and solenoid SOL 3 is dropped to stop relative longitudinal movement between the workpiece and the tool, terminating the cut at 28e. The energization of solenoid SOL 5 raises the spindle carrier until limit switch 6LS is operated, the springs 143 holding the carrier raised.

When limit switch 6LS is operated, normally open contacts 6LS1 close and relay 6CR is energized through those contacts, normally open contacts 5CR3 of relay 5CR, and normally closed contacts 1LS2 of limit switch 1LS. When relay 6CR is energized, normally open contacts 6CR1 close, sealing in relay 6CR, and normally closed contacts 6CR3 open, dropping out relay 5CR and hence solenoid SOL 5. At the same time, normally open contacts 6CR2 of relay 6CR close, energizing solenoid SOL 2 to initiate rapid traverse of the table to the right. When the table reaches the home position, limit switch 1LS is operated by table control dog 1CD, opening normally closed contacts 1LS2 to drop relay 6CR and solenoid SOL 2, and closing normally open contacts 1LS1 to condition the circuit for initiation of the next cycle.

Figure 7:
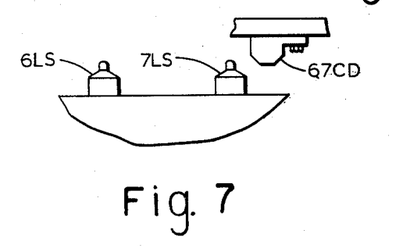
FIGS. 7 and 8 show modified arrangements of the control elements.
Figure 8:
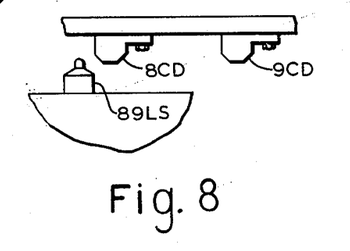

In the embodiment of the invention above described, a separate control dog is provided for each limit switch, and, conversely, a separate limit switch is provided for each control dog. This permits initiating machine movements at closely spaced intervals during longitudinal movement of the table. In most operations, however, two limit switches, such as 6LS and 7LS in FIG. 7, can be operated by a single control dog 67CD, or a single limit switch, such as 89LS in FIG. 8, can be operated by two control dogs 8CD and 9CD, to produce two separate control signals. Thus, the three control elements of FIG. 7 can be considered as defining two pair of complementary control elements 6LS, 67CD and 7LS, 67CD. Similarly, the three control elements of FIG. 8 can be considered as defining two pair of complementary control elements 89LS, 8CD and 89LS, 9CD.

What is claimed is:

1. In a machine tool, mechanism for effecting a machining operation on a workpiece relative to a reference surface thereon comprising:
   (a) means to grip the workpiece,
   (b) a tool,
   (c) means to effect relative longitudinal movement and relative cross movement between the workpiece and the tool,
   (d) a locating member mounted for engagement with the reference surface of the workpiece and fixed in the longitudinal direction with respect to the workpiece during said relative longitudinal movement,
   (e) and means operable in accordance with the fixed longitudinal position of the locating member relative to the workpiece while engaged with the reference surface of the workpiece to control said relative cross movement.

2. In a machine tool, mechanism for effecting a machining operation in predetermined relation to a reference surface on a workpiece comprising:
   (a) means to grip the workpiece,
   (b) a tool,
   (c) means to effect relative longitudinal movement and relative cross movement between the workpiece and the tool,
   (d) a locating member shiftable relative to said workpiece gripping means and positionable in engagement with the reference surface of the workpiece for contact therewith during said relative longitudinal movement,
   (e) a pair of complementary control members,
      (1) one of said control members mounted on the locating member and fixed in the longitudinal direction relative to the workpiece when the locating member is in contact with the workpiece reference surface,
      (2) the other of said control members fixed in the longitudinal direction relative to the tool, said control members positioned for operating engagement during said relative longitudinal movement between the workpiece and the tool,
   (f) and means responsive to operating engagement between said control members to control said relative cross movement between the workpiece and the tool.

3. In a machine tool, mechanism for effecting a machining operation in predetermined relation to a reference surface on a workpiece comprising:
   (a) means to grip the workpiece,
   (b) a tool,
   (c) means to effect relative longitudinal movement and relative cross movement between the workpiece and the tool,
   (d) a locating member shiftable relative to said workpiece gripping means and positionable in engagement with the reference surface of the workpiece for contact therewith during said relative longitudinal movement,
   (e) two pair of complementary control members,
      (1) one member of each pair mounted on the locating member and fixed in the longitudinal direction relative to the workpiece when the locating member is in contact with the workpiece reference surface,
      (2) the other member of each pair fixed in the longitudinal direction relative to the tool,
   (f) and means responsive to operating engagement between said control members to control said relative cross movement between the workpiece and the tool.

4. In a machine tool, mechanism for effecting a machining operation in predetermined relation to a reference surface on a workpiece comprising:
   (a) a table member,
   (b) a tool,
   (c) means to effect relative longitudinal and relative cross movement between the table member and the tool,
   (d) workpiece gripping means secured on the table member,
   (e) a locating member slidably mounted on said table member for adjusting movement thereon in the longitudinal direction and positionable in engagement with the reference surface of the workpiece,
   (f) a first control member fixed on the locating member,
   (g) a second control member mounted in predetermined fixed relation to the tool in the longitudinal direction and positioned for operating engagement with the first control member during said relative longitudinal movement between the table member and the tool,
   (h) and means responsive to operating engagement between said control members to control said relative cross movement between the workpiece and the tool.

5. In a machine tool, mechanism for effecting a machining operation determined by the size of a workpiece from a lot of random sized workpieces comprising:
   (a) a table member,
   (b) a tool,
   (c) means to effect relative longitudinal and relative cross movement between the table member and the tool,
   (d) workpiece gripping means secured on the table member,
   (e) a locating member slidably mounted on said table member for adjusting movement thereon in the longitudinal direction and positionable in engagement with a reference surface of the workpiece, (f) a first control member fixed on the locating member, (g) a second control member fixed on the table member, (h) and control means operable when said first control member is in predetermined relation to the tool in the longitudinal direction to initiate said relative cross movement in one direction and operable when said second control member is in predetermined relation to the tool in the longitudinal direction to initiate relative cross movement in the opposite direction.

6. In a machine tool, mechanism for effecting a machining operation in predetermined relation to opposite ends of a workpiece comprising:
 (a) a table member,
 (b) a tool,
 (c) means to effect relative longitudinal movement and relative cross movement between the table member and the tool,
 (d) workpiece supporting means secured on the table member to grip one end of the workpiece,
 (e) a locating member slidably mounted on said table member for adjusting movement thereon in the longitudinal direction and positionable in engagement with the opposite end of the workpiece,
 (f) two pair of complementary control members,
  (1) one member of one pair mounted on the locating member and fixed in the longitudinal direction relative to the workpiece when the locating member is in contact with said opposite end of the workpiece,
  (2) one member of the other pair mounted on the table member,
  (3) the other member of each pair fixed in the longitudinal direction relative to the tool,
 (g) and means responsive to operating engagement between control members of said respective pairs to control said relative cross movement between the table member and the tool.

7. In a machine tool, mechanism for effecting a machining operation in predetermined spaced relation to one end of the workpiece comprising:
 (a) a table member,
 (b) a tool,
 (c) means to effect relative longitudinal and relative cross movement between the table member and the tool,
 (d) a chuck secured to the table member to grip the end of the workpiece opposite said one end,
 (e) a locating member slidably mounted on said table member for adjusting movement thereon in the longitudinal direction,
 (f) a positioning motor to shift the locating member into contact with said one end of the workpiece,
 (g) a control dog fixed on said locating member,
 (h) a control member mounted in predetermined fixed relation to the tool in the longitudinal direction and positioned for operating engagement with the control dog during said relative longitudinal movement between the table member and the tool, said control member effective in response to said operating engagement to control said relative cross movement between the workpiece and the tool.

8. In a machine tool, mechanism for effecting a machining operation on workpieces of random length comprising:
 (a) a table member,
 (b) a tool carrier having a tool supported thereby,
 (c) a first motor to effect relative longitudinal movement between the table member and the tool carrier,
 (d) a second motor to effect relative cross movement between the table member and the tool carrier,
 (e) two workpiece supporting members comprising a headstock mounted on the table member to grip one end of a workpiece and a tailstock mounted on said table member to engage the opposite end of the workpiece, one of said workpiece supporting members adjustable on the table member relative to the other in the longitudinal direction to accommodate workpieces of different length, said adjustable workpiece supporting member having at least one control dog thereon,
 (f) at least one control member mounted in predetermined fixed relation to the tool carrier in the longitudinal direction and positioned for control dog actuation during said relative longitudinal movement between the table member and the tool member, said control dog actuation operable to control said second motor to effect, successively, advance and retraction between the table member and the tool carrier in the cross direction.

9. In a machine tool, mechanism for effecting a machining operation on workpieces of random length comprising:
 (a) a table member,
 (b) a tool carrier having a tool supported thereby,
 (c) a first motor to effect relative longitudinal movement between the table member and the tool carrier,
 (d) a second motor to effect relative cross movement between the table member and the tool carrier,
 (e) two workpiece supporting members comprising a headstock mounted on the table member to grip one end of a workpiece and a tailstock mounted on said table member to engage the opposite end of the workpiece, one of said workpiece supporting members fixed on the table member and the other of said workpiece supporting members adjustable on the table member relative to said one workpiece supporting member in the longitudinal direction to accommodate workpieces of different length, said adjustable workpiece supporting member having a first control dog thereon,
 (f) a second control dog mounted in predetermined fixed relation to the workpiece supporting member fixed on the table member in the longitudinal direction,
 (g) at least one control member mounted in predetermined fixed relation to the tool carrier in the longitudinal direction and positioned for control dog actuation during relative longitudinal movement between the table member and the tool member, said control dog actuation operable to control said second motor and effect, successively, advance and retraction between the table member and the tool carrier in the cross direction.

10. In a milling machine, mechanism for effecting a machining operation on workpieces of random length comprising:
 (a) a base member,
 (b) a table member mounted on the base,
 (c) a tool carrier mounted on the base and having a tool supported thereby,
 (d) a first motor connected to the table member to effect longitudinal movement thereof on the base past the tool carrier,
 (e) a second motor connected to the tool carrier to effect cross movement thereof on the base towards and away from the table member,
 (f) a headstock secured on the table member to grip one end of a workpiece and a tailstock mounted on said table member to engage and support the opposite end of the workpiece, said tailstock adjustable on the table member in the longitudinal direction to accommodate workpieces of different length, said tailstock having at least one control dog thereon,
 (g) a positioning motor to shift the tailstock into contact with said opposite end of the workpiece,
 (h) at least one control member mounted on the base and positioned for control dog actuation during relative longitudinal movement between the table member and the tool member, said control dog actuation operable to control said second motor for advance and retraction of the tool relative to the workpiece.

11. In a milling machine, mechanism for effecting a machining operation on workpieces of random length comprising:
(a) a base member,
(b) a table member mounted on the base,
(c) a tool carrier mounted on the base and having a tool supported thereby,
(d) A first motor connected to the table member to effect longitudinal movement thereof on the base past the tool carrier,
(e) a second motor connected to the tool carrier to effect cross movement thereof on the base towards and away from the table member,
(f) a headstock secured on the table member to grip one end of a workpiece and a tailstock mounted on said table member to engage and support the opposite end of the workpiece, said tailstock adjustable on the table member in the longitudinal direction to accommodate workpieces of different length,
(g) a positioning motor to shift the tailstock into contact with said opposite end of the workpiece,
(h) a first control dog mounted on the tailstock,
(i) a second control dog mounted on the table member,
(j) control means comprising at least one control member mounted on the base and positioned for control dog actuation during relative longitudinal movement between the table member and the tool member, said control means operable to control said second motor for advance of the tool into the workpiece in response to actuation by one of said control dogs and for retraction of the tool from the workpiece in response to actuation by the other of said control dogs.

References Cited in the file of this patent
UNITED STATES PATENTS

| | | |
|---|---|---|
| 860,760 | Muller | July 23, 1907 |
| 1,407,820 | Rice | Feb. 28, 1922 |
| 2,154,326 | Dorin | Apr. 11, 1939 |
| 2,365,043 | Blood et al. | Dec. 12, 1944 |
| 2,489,227 | Roehm et al. | Nov. 22, 1949 |